United States Patent
Park et al.

(10) Patent No.: US 8,274,939 B2
(45) Date of Patent: Sep. 25, 2012

(54) METHOD OF TRANSMITTING DATA BLOCK IN WIRELESS COMMUNICATION SYSTEM

(75) Inventors: Sung Jun Park, Anyang-si (KR); Young Dae Lee, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 481 days.

(21) Appl. No.: 12/527,577

(22) PCT Filed: Mar. 21, 2008

(86) PCT No.: PCT/KR2008/001597
§ 371 (c)(1),
(2), (4) Date: Aug. 18, 2009

(87) PCT Pub. No.: WO2008/115025
PCT Pub. Date: Sep. 25, 2008

(65) Prior Publication Data
US 2010/0091723 A1    Apr. 15, 2010

(30) Foreign Application Priority Data
Apr. 30, 2007  (KR) .................. 10-2007-0042208

(51) Int. Cl.
*H04W 4/00* (2009.01)
*H04J 3/16* (2006.01)
(52) U.S. Cl. ..................... 370/329; 370/471
(58) Field of Classification Search .......... 370/329, 370/471
See application file for complete search history.

(56) References Cited

U.S. PATENT DOCUMENTS

| 6,901,060 | B1 | 5/2005 | Lintulampi |
| 2002/0176439 | A1 | 11/2002 | Demerville et al. |
| 2003/0008653 | A1 | 1/2003 | Jiang |
| 2003/0147396 | A1 | 8/2003 | Jiang |
| 2007/0248075 | A1* | 10/2007 | Liu et al. ................ 370/349 |

FOREIGN PATENT DOCUMENTS

| EP | 1168759 | 1/2002 |
| EP | 1326388 | 7/2003 |
| JP | 10-066157 | 3/1998 |
| JP | 2002-199050 | 7/2002 |
| JP | 2003-111148 | 4/2003 |

(Continued)

OTHER PUBLICATIONS

NTT DoCoMo, Inc., "RLC Sequence Numbering for LTE," R2-061977, 3GPP TSG RAN WG2 Ad Hoc on LTE, Jun. 2006.

(Continued)

*Primary Examiner* — Kenny Lin
(74) *Attorney, Agent, or Firm* — Lee, Hong, Degerman, Kang & Waimey

(57) ABSTRACT

A method of transmitting a data block in a wireless communication system includes generating a data block having a variable size in an upper layer, transmitting a radio resource request message to a base station according to the size of the data block in a medium access control (MAC) layer and transmitting the data block by using a radio resource allocated by using the radio resource request message. For a packet service such as VoIP in which a delay time is important, QoS can be improved by decreasing the delay time of packet transmission and by decreasing a packet discard ratio.

6 Claims, 11 Drawing Sheets

FOREIGN PATENT DOCUMENTS

| | | |
|---|---|---|
| JP | 2006-203265 | 8/2006 |
| RU | 2204215 | 5/2003 |
| WO | 01/20924 A1 | 3/2001 |
| WO | 2005/034364 A2 | 4/2005 |
| WO | 2005/046086 | 5/2005 |
| WO | 2006/104344 | 10/2006 |
| WO | 2006/116620 | 11/2006 |
| WO | 2006/118435 | 11/2006 |

OTHER PUBLICATIONS

Samsung, "Selective Forwarding/Retransmission During HO," R2-070130, 3GPP TSG-RAN2 Meeting #56bis, Jan. 2007.

Ericsson et al., "DL Re-Ordering and Forwarding," R2-070250, 3GPP TSG-RAN WG2#56bis, Jan. 2007.

Samsung, "Re-use of PDCP SN at ARQ level?," R2-061829, 3GPP TSG-RAN2 Meeting #53bis, Jun. 2006.

* cited by examiner

[Fig. 1]
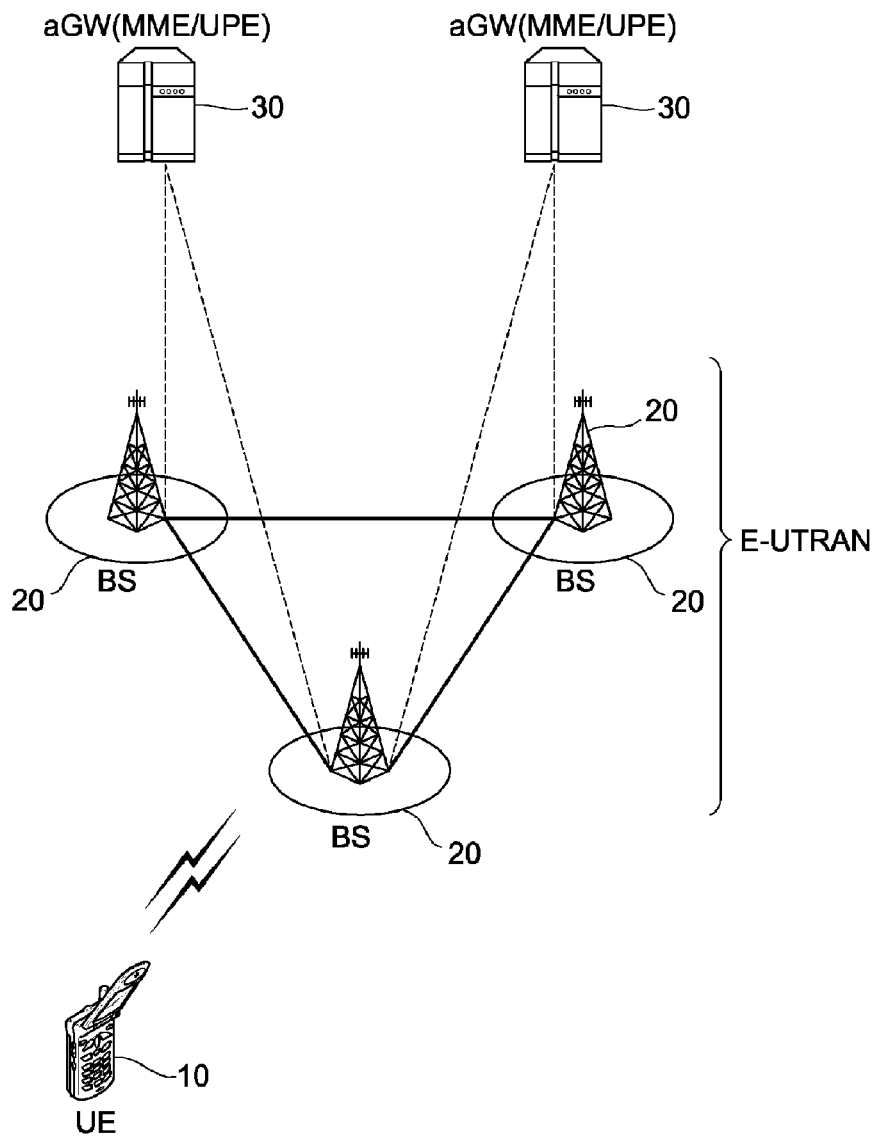
[Fig. 2]
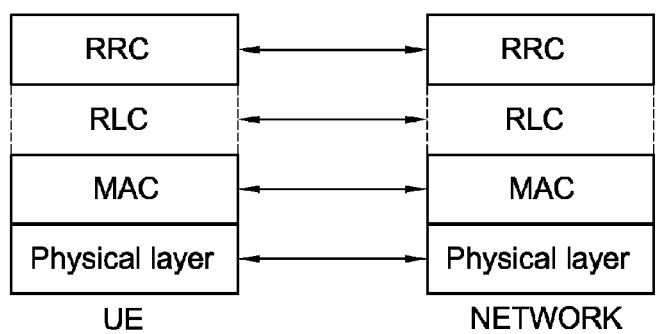

[Fig. 3]
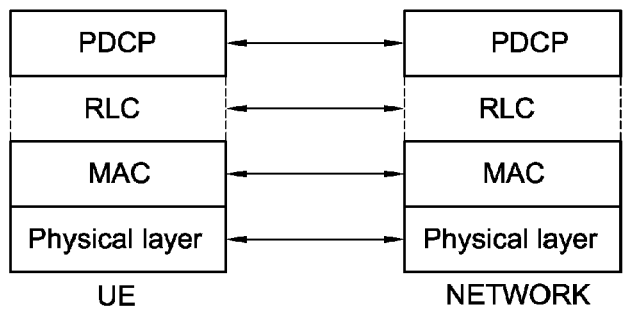
[Fig. 4]
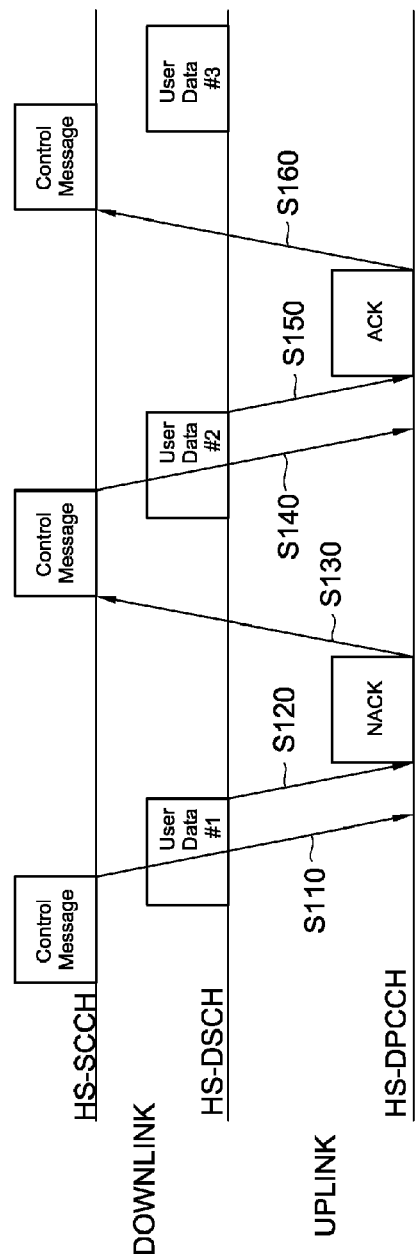

[Fig. 5]
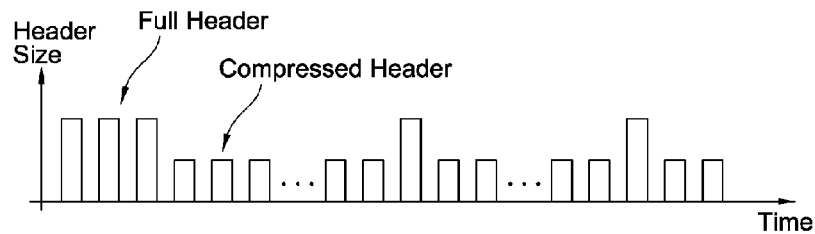
[Fig. 6]
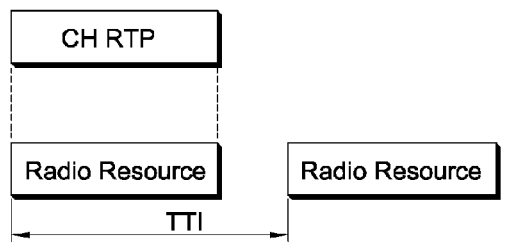
[Fig. 7]
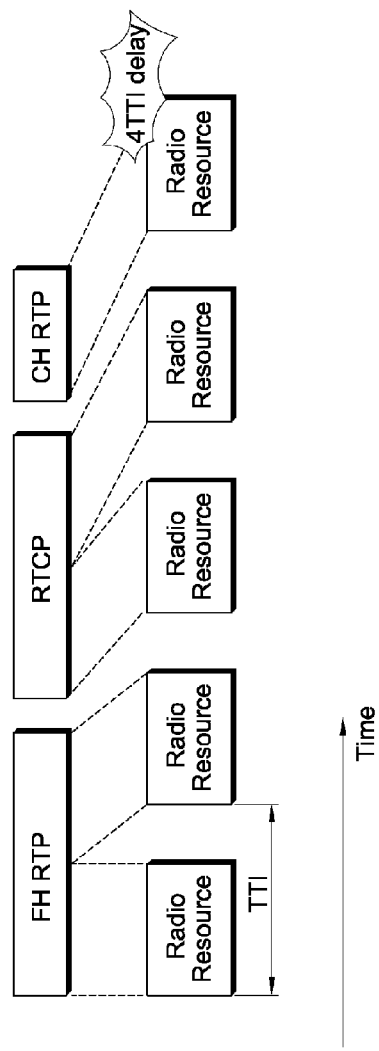

[Fig. 8]
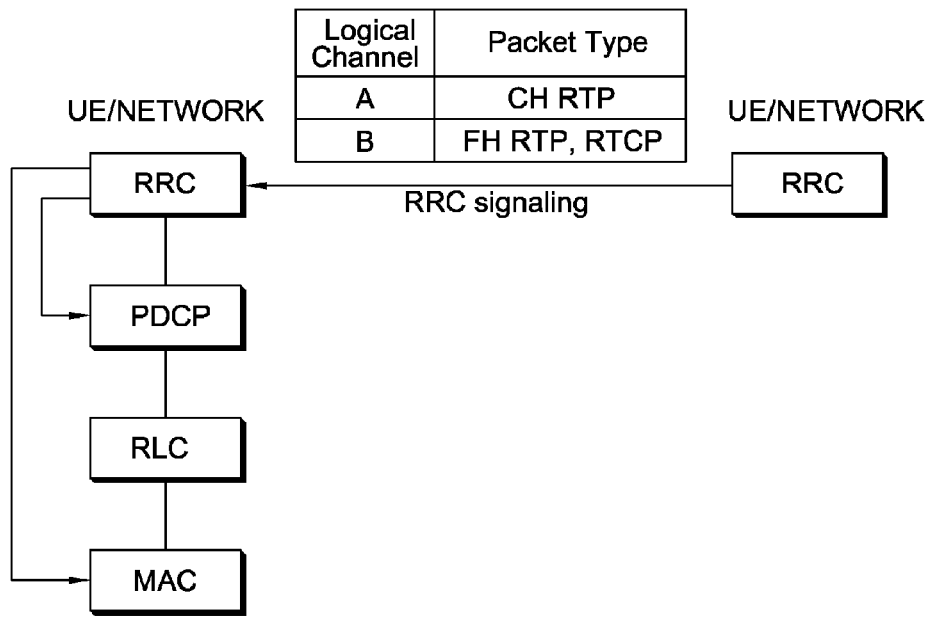
[Fig. 9]
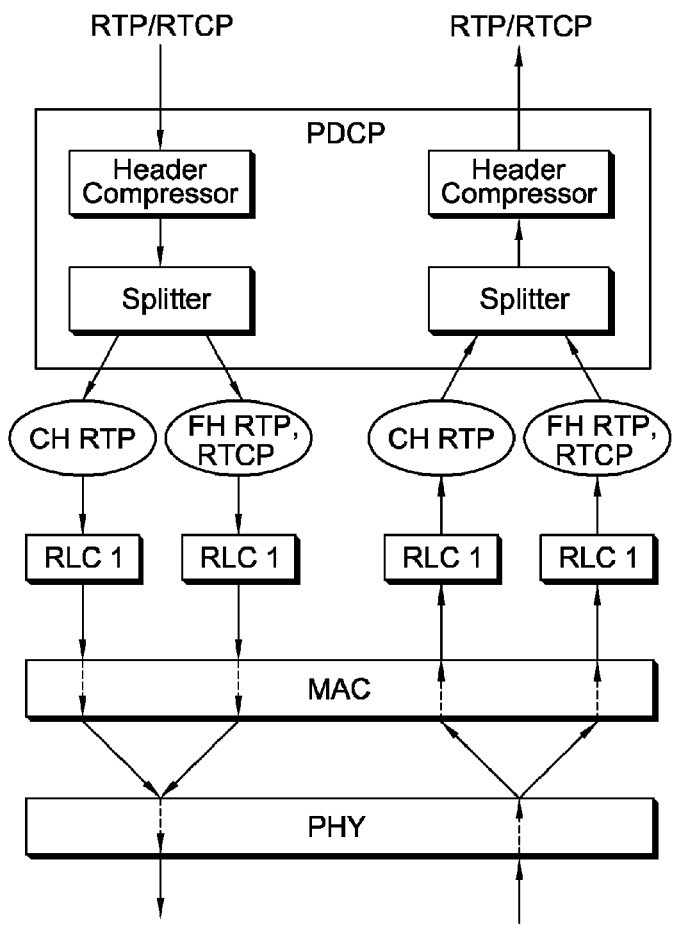

[Fig. 10]
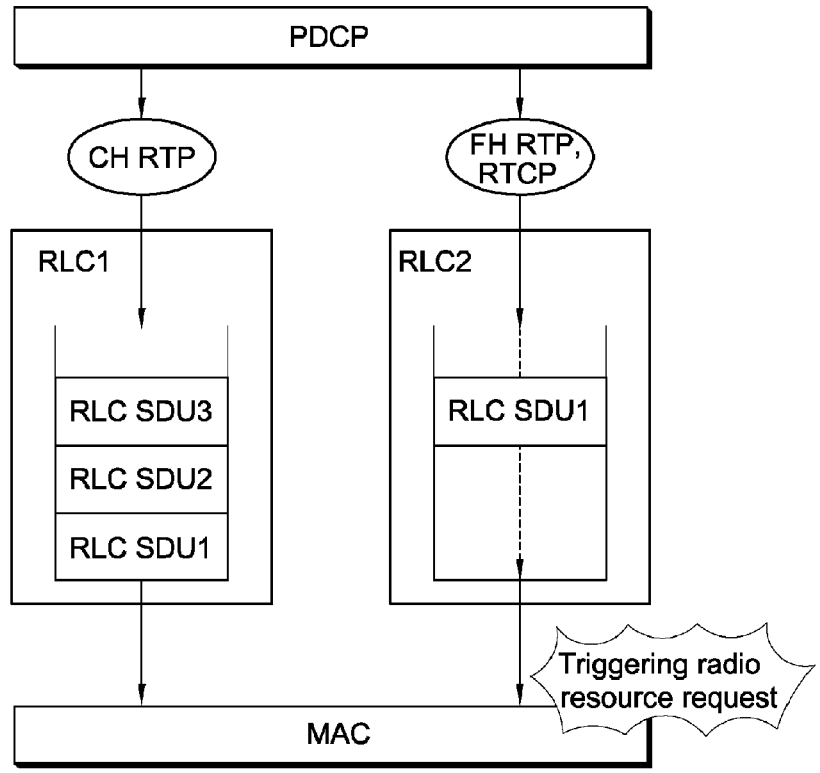
[Fig. 11]
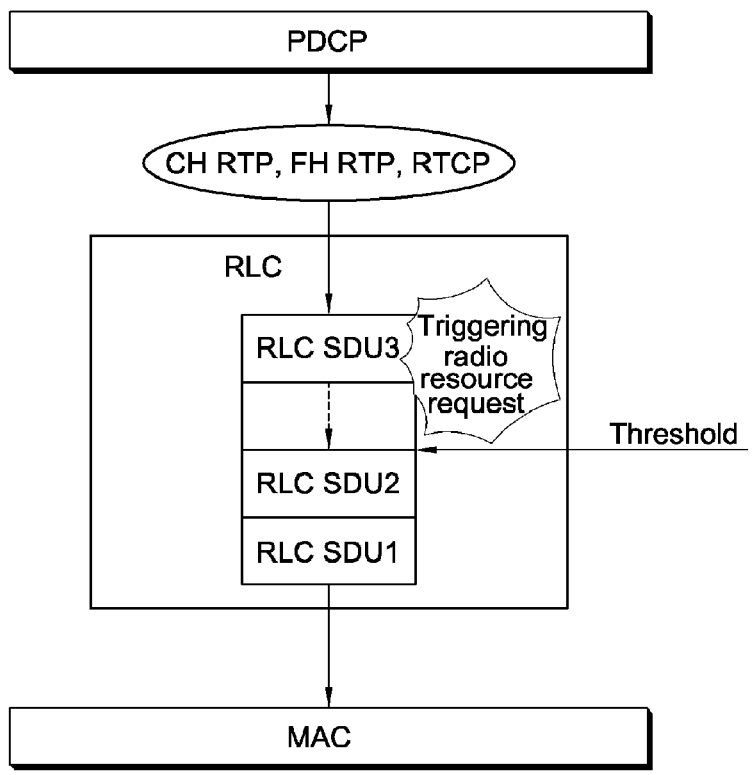

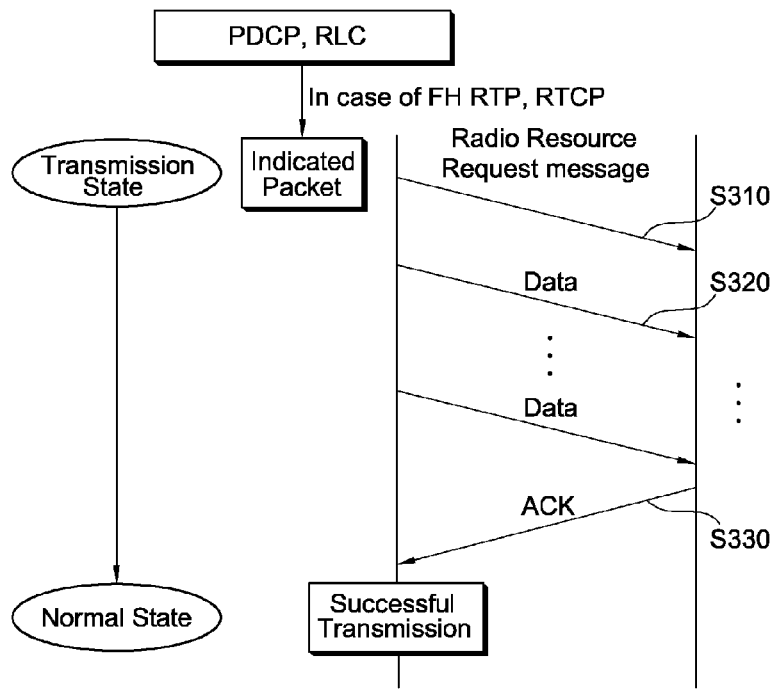
[Fig. 12]
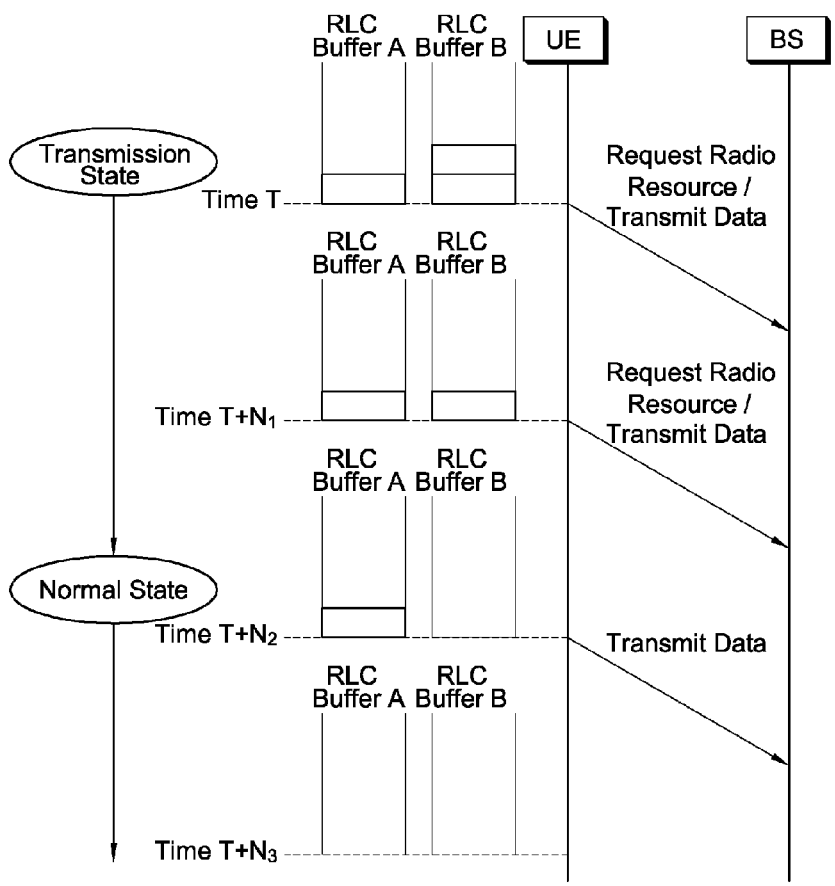
[Fig. 13]

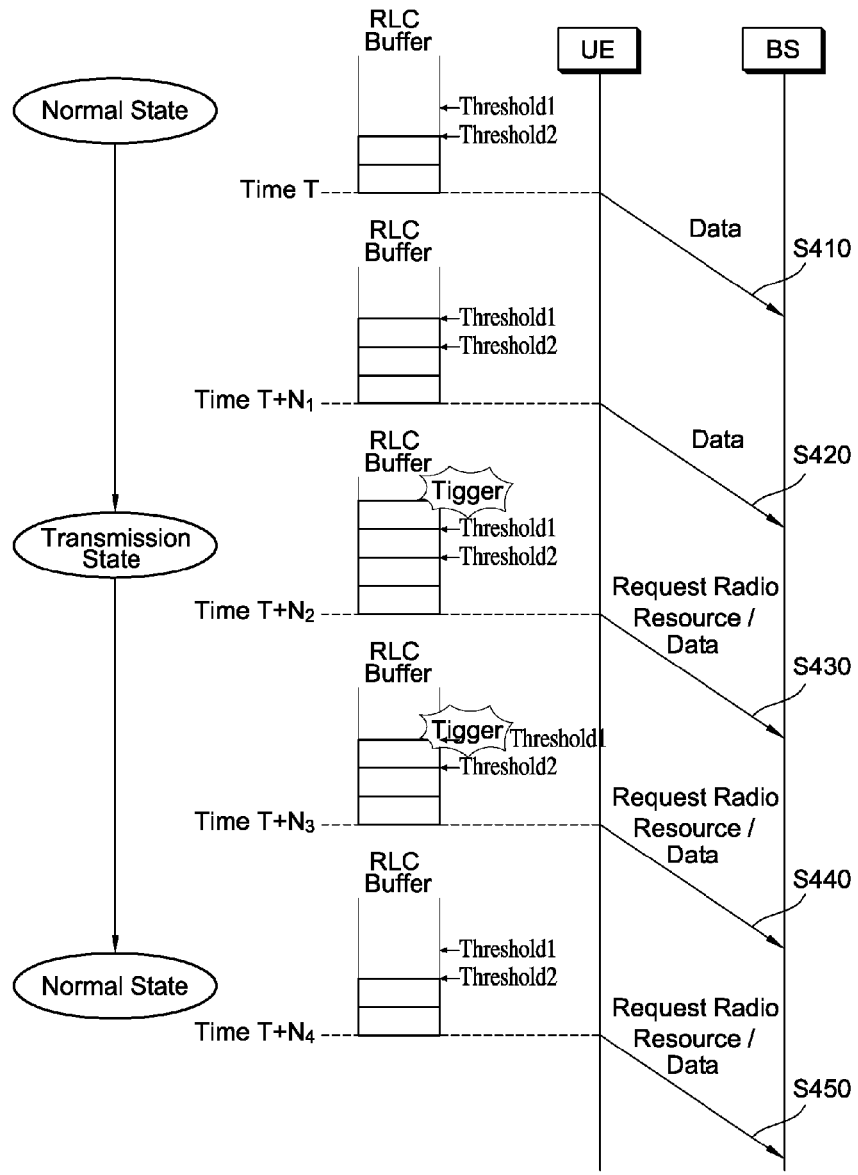
[Fig. 14]
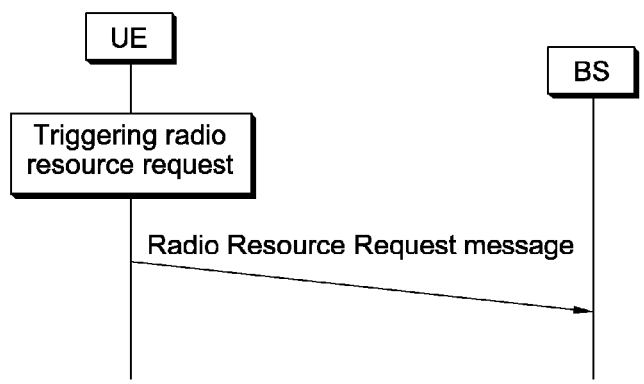
[Fig. 15]

[Fig. 16]
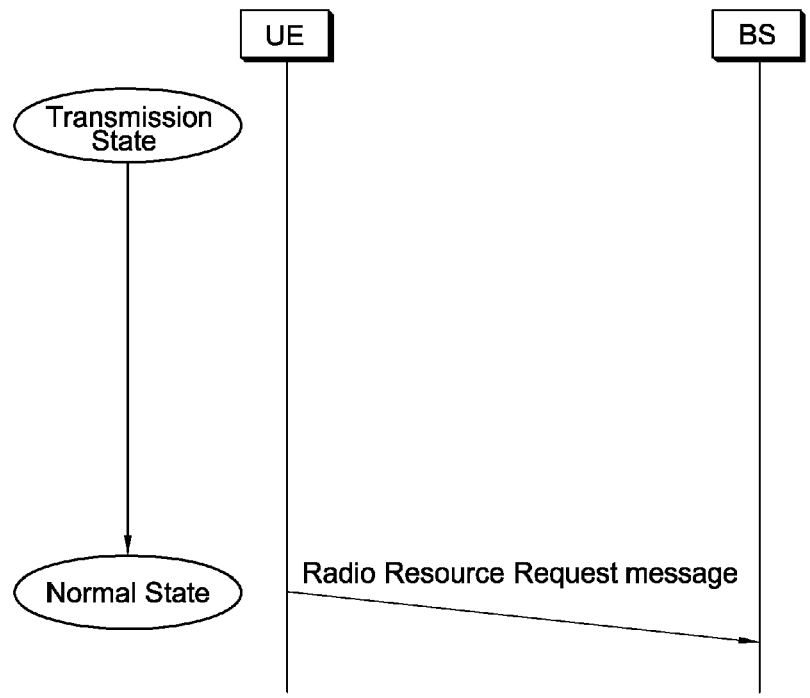
[Fig. 17]
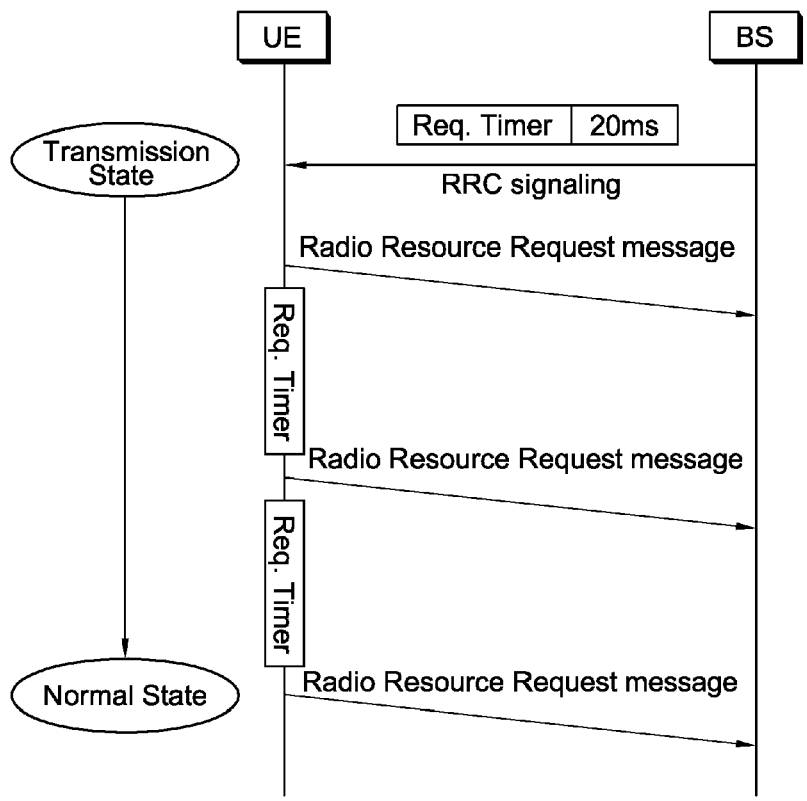

[Fig. 18]
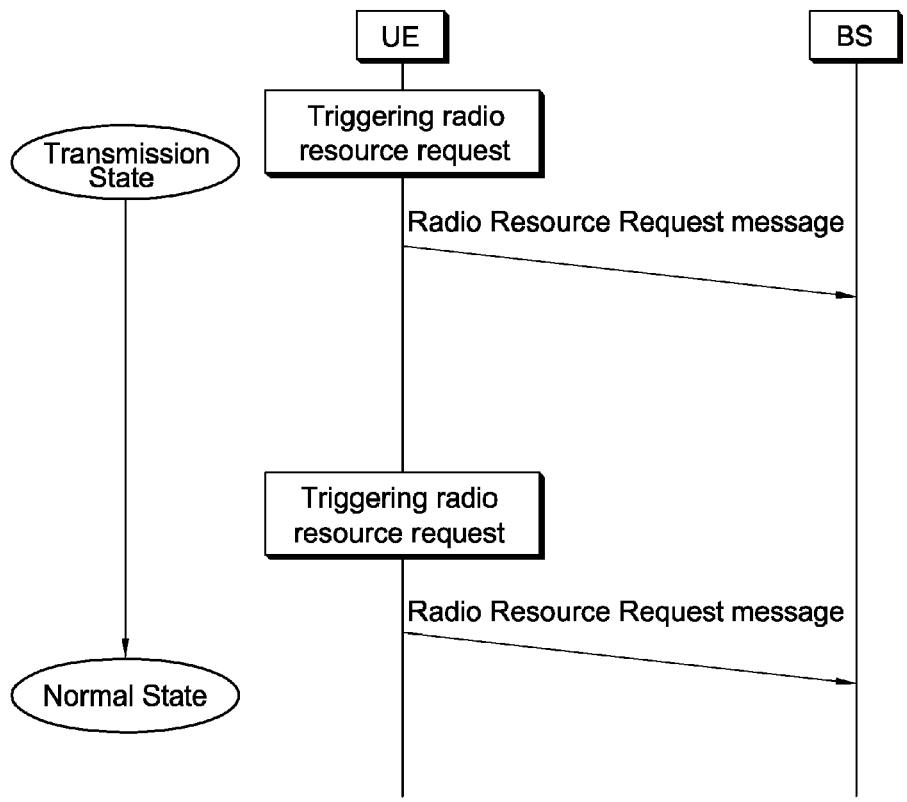
[Fig. 19]
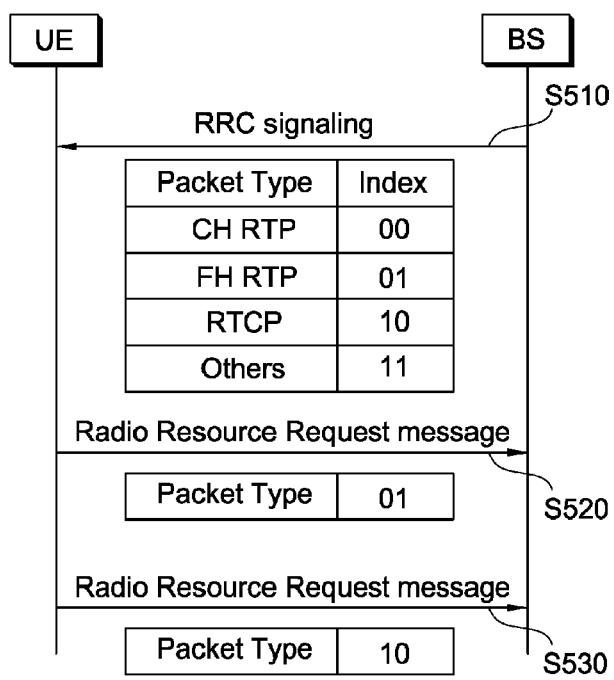

[Fig. 20]
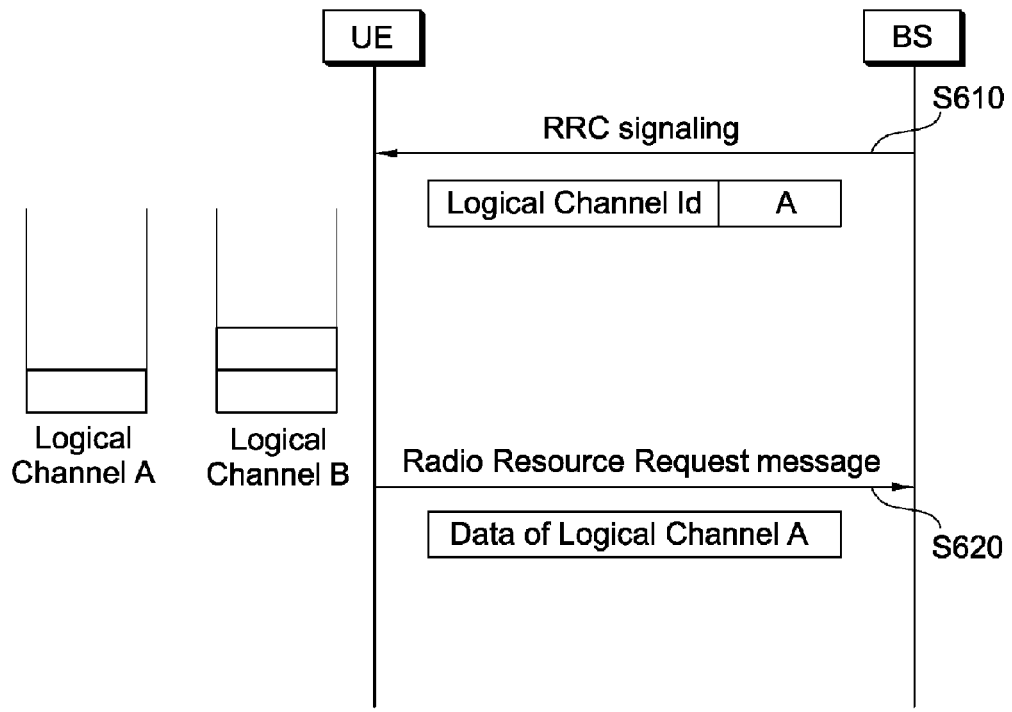
[Fig. 21]
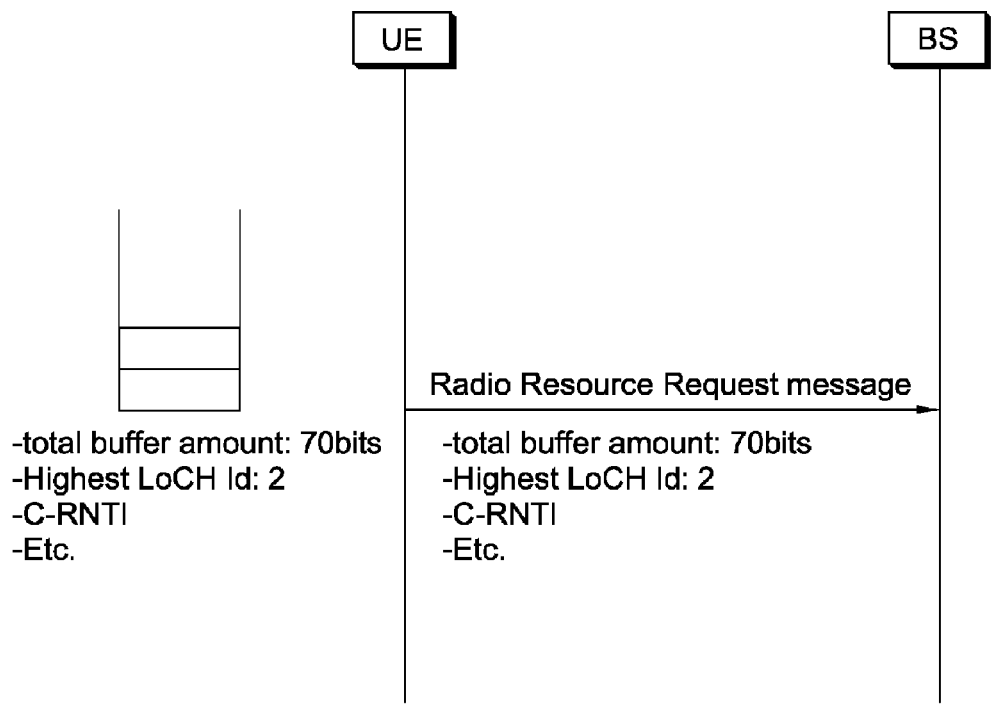

[Fig. 22]
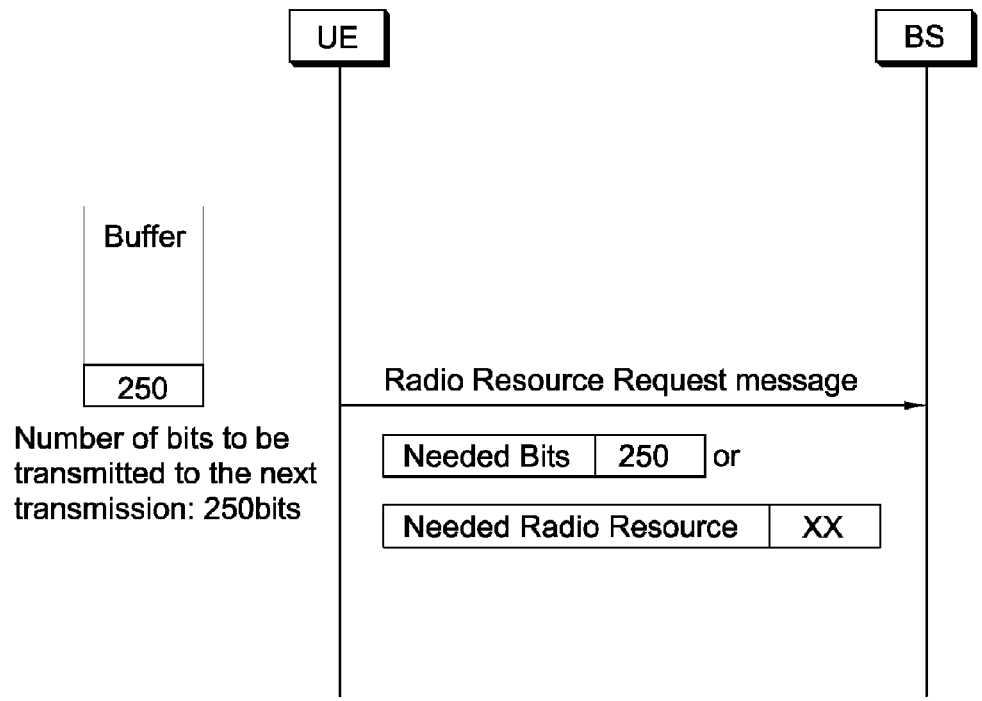
[Fig. 23]
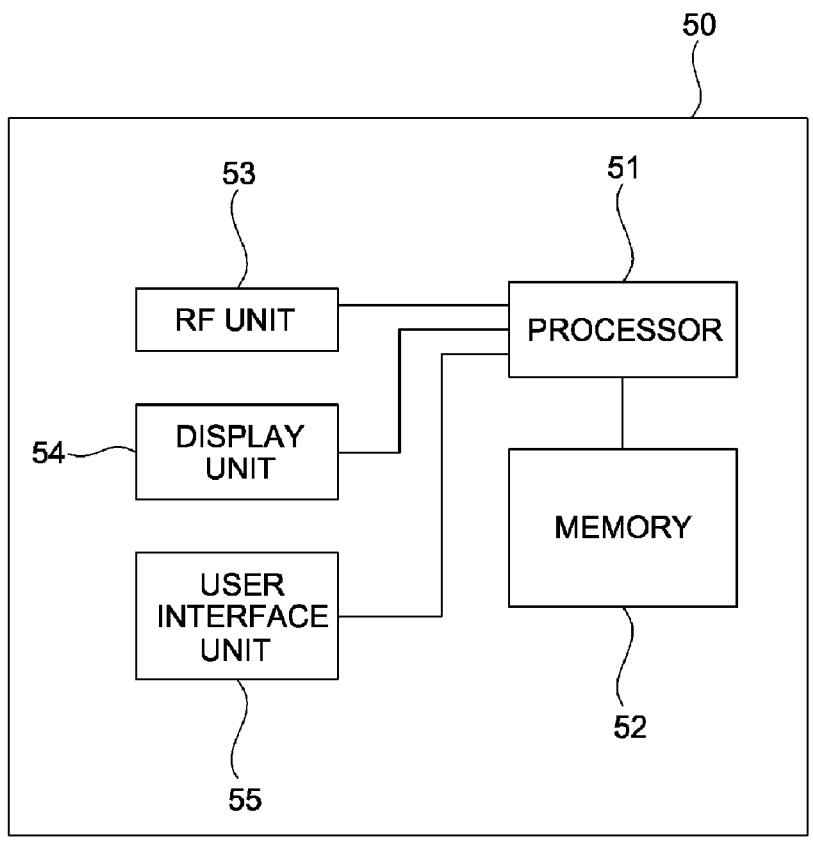

METHOD OF TRANSMITTING DATA BLOCK IN WIRELESS COMMUNICATION SYSTEM

CROSS-REFERENCE TO RELATED APPLICATIONS

This application is the National Stage filing under 35 U.S.C. 371 of International Application No. PCT/KR2008/001597, filed on Mar. 21, 2008, which claims the benefit of earlier filing date and right of priority to Korean Application No. 10-2007-0042208, filed on Apr. 30, 2007, and also claims the benefit of U.S. Provisional Application Ser. No. 60/896,474, filed on Mar. 22, 2007.

TECHNICAL FIELD

The present invention relates to wireless communication, and more particularly, to a method of transmitting a data block, whereby quality of service (QoS) is improved by decreasing a delay time and a packet discard ratio.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment, and the like are defined as requirements.

Voice over IP (VoIP) is voice data transmission service over an Internet protocol (IP) network. Conventionally, voice service has been provided in a circuit switched (CS) domain. In the VoIP, however, the voice service is provided in a packet switched (PS) domain. In CS-based voice services, the voice data is transmitted while connections are maintained in an end-to-end manner. On the other hand, in the VoIP, since the voice data can be transmitted in a connection-less manner, network resources can be very effectively used.

With the development of a wireless communication technique, an amount of user data is rapidly increased. Thus, for effective use of limited network resources, the conventional CS-based services have recently been replaced with PS-based services. The VoIP is being developed in the same vein, and it is expected that all voice services are provided over the VoIP in most of wireless communication systems in the future.

Although the VoIP has an advantage in that network resources can be effectively used, there is also a demerit in that quality of service (QoS) is inferior to that of the CS-based voice services. The QoS is affected by several factors. Representative examples thereof are a delay, a jitter, a high frame error rate (FER), etc. In the initial stage of the development of the VoIP, the QoS was significantly inferior to that of the CS-based service. However, as many researches have been conducted, the VoIP currently used in wired communications ensures almost equivalent QoS as the CS-based voice services.

A real-time transport protocol (RTP) is developed to effectively provide the PS-based voice services. Further, an RTP control protocol (RTCP) is also developed to control the RTP. In the RTP, time stamp information is carried in every packet, and thus a jitter problem can be solved. Further, by reporting loss of an RTP packet through the RTCP, the FER can be reduced through rate control. In addition to the RTP/RTCP, with the development of a session initiation protocol (SIP) and a session description protocol (SDP), virtual connections can be maintained in an end-to-end manner. Therefore, the delay problem can be mostly solved.

At present, in wired communications, satisfactory QoS can be ensured over VoIP. However, in wireless communications, QoS provided over VoIP is far interior to that of the CS-based services. To improve transmission efficiency of the VoIP in a wireless communication environment, an improved header compression scheme (i.e., robust header compression (ROHC)) has been developed and used recently. Still, overall QoS is interior to that of the CS-based voice services.

The RTP and the RTCP are provided by using one stream in wired communications. However, due to different packet characteristics, when the RTP and the RTCP are provided by using one stream in wireless communications, QoS is significantly decreased, which results in one of the biggest problems occurring in the wireless communication system supporting the VoIP. Specifically, the RTP which is real-time user data is insensitive to an error but is sensitive to a delay and a jitter, whereas, the RTCP which is control data is insensitive to the delay and the jitter but is sensitive to the error. Further, in the RTP, since voice data is carried, a small-sized packet is frequently and regularly transmitted. On the other hand, in the RTCP, since control data is carried, a much larger sized packet is transmitted less frequently and less regularly in comparison with the RTP.

Accordingly, there is a need for a method of improving QoS of voice data so that VoIP can be effectively implemented in a wireless communication system.

DISCLOSURE OF INVENTION

Technical Problem

A method is sought for generating information which requests radio resources so as to transmit a data block having various sizes and types.

Technical Solution

In an aspect, a method of transmitting a data block in a wireless communication system is provided. The method includes generating a data block having a variable size in an upper layer, transmitting a radio resource request message to a base station according to the size of the data block in a medium access control (MAC) layer and transmitting the data block by using a radio resource allocated by using the radio resource request message.

In another aspect, a method of transmitting a data block in a wireless communication system is provided. The method includes triggering a radio resource request message according to a data block, the block delivered from an upper layer in a MAC layer, transmitting the radio resource request message to a base station and transmitting the data block by using a radio resource allocated by using the radio resource request message.

Advantageous Effects

Quality of service (QoS) can be effectively provided in a wireless communication system. In particular, for a packet service such as voice over Internet protocol (VoIP) in which a delay time is important, QoS can be improved by decreasing the delay time of packet transmission and by decreasing a packet discard ratio.

BRIEF DESCRIPTION OF THE DRAWINGS

FIG. 1 shows a structure of a wireless communication system.

FIG. 2 is a diagram showing a control plane of a radio interface protocol.

FIG. 3 is a diagram showing a user plane of a radio interface protocol.

FIG. 4 shows an example of a hybrid automatic repeat request (HARM) scheme.

FIG. 5 shows an example of transmission of a full header (FH) packet and a compressed header (CH) packet when a header compression scheme is used.

FIG. 6 shows transmission of a CH real-time transport protocol (RTP) packet.

FIG. 7 shows an example of a transmission delay of a CH RPT packet when a FH RPT packet and an RTP control protocol (RTCP) packet are transmitted.

FIG. 8 shows a method of using a different logical channel according to a packet type.

FIG. 9 shows an example of transmission and reception of voice data on a logical channel identified according to a packet type.

FIG. 10 shows an example of triggering for radio resource request by using a radio link control (RLC) buffer.

FIG. 11 shows an example of triggering for radio resource request according to a data amount of an RLC buffer.

FIG. 12 shows an example of a transition to a normal state.

FIG. 13 shows another example of a transition to a normal state.

FIG. 14 shows another example of a transition to a normal state.

FIG. 15 is a flow diagram showing an example of a method of transmitting a radio resource request message.

FIG. 16 is a flow diagram showing another example of a method of transmitting a radio resource request message.

FIG. 17 is a flow diagram showing another example of a method of transmitting a radio resource request message.

FIG. 18 is a flow diagram showing another example of a method of transmitting a radio resource request message.

FIG. 19 is a flow diagram showing an example of transmission of a radio resource request message.

FIG. 20 is a flow diagram showing another example of transmission of a radio resource request message.

FIG. 21 is a flow diagram showing another example of transmission of a radio resource request message.

FIG. 22 is a flow diagram showing another example of transmission of a radio resource request message.

FIG. 23 is a block diagram showing constitutional elements of a user equipment.

MODE FOR THE INVENTION

FIG. 1 shows a structure of a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20. A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, downlink is defined as a communication from the BS 20 to the UE 10, and uplink is defined as a communication from the UE 10 to the BS 20.

The BS 20 provides the UE 10 with an end-to-end point of a user plane and a control plane. The BSs 20 are interconnected by means of an X2 interface, and may have a meshed network structure in which the X2 interface always exists between the neighboring BSs 20.

The BSs 20 are also connected by means of an S1 interface to an evolved packet core (EPC), more specifically, to an access gateway (aGW) 30. The aGW 30 provides an end-to-end point for a session and mobility management function of the UE 10. The S1 interface may be provided between the BS 20 and the aGW 30 so that a plurality of nodes can be interconnected in a many-to-many manner. The aGW 30 can be classified into a part for processing user traffic and a part for processing control traffic. In this case, for inter-communication, a new interface may be used between an aGW for processing new user traffic and an aGW for processing new control traffic. The aGW 30 is also referred to as a mobility management entity/user plane entity (MME/UPE).

Layers of a radio interface protocol between a UE and a network can be classified into L1 layer (a first layer), L2 layer (a second layer), and L3 layer (a third layer) based on the lower three layers of the open system interconnection (OSI) model that is well-known in a communication system. A physical layer belongs to the first layer and provides an information transfer service on a physical channel. A radio resource control (RRC) layer belongs to the third layer and serves to control radio resources between the UE and the network. The UE and the network exchange RRC messages via the RRC layer. The RRC layer may be located in network nodes (i.e., the BS 20, the aGW 30, etc.) in a distributed manner, or may be located only in the BS 20 or the aGW 30.

The radio interface protocol horizontally includes a physical layer, a data link layer, and a network layer, and vertically includes a user plane for data information transfer and a control plane for control signaling delivery.

FIG. 2 is a diagram showing a control plane of a radio interface protocol. FIG. 3 is a diagram showing a user plane of the radio interface protocol. In FIGS. 2 and 3, a structure of the radio interface protocol between a UE and an E-UTRAN is based on the third generation partnership project (3GPP) radio access network standard.

Referring to FIGS. 2 and 3, a physical layer, i.e., a first layer, provides an upper layer with an information transfer service on a physical channel. The physical layer is coupled with a media access control (MAC) layer, i.e., an upper layer of the physical layer, via a transport channel. Data is transferred between the MAC layer and the physical layer on the transport channel. In addition, data is transferred between different physical layers, i.e., between physical layers of a transmitting side and a receiving side.

The MAC layer in a second layer provides services to a radio link control (RLC) layer, i.e., an upper layer of the MAC layer, via a logical channel. The RLC layer in the second layer supports reliable data transfer. Functions of the RLC layer can be implemented as a function block included in the MAC layer. In this case, the RLC layer (indicated by a dotted line) may not exist.

A packet data convergence protocol (PDCP) belonging to the second layer performs a header compression function. When transmitting an Internet protocol (IP) packet such as an IPv4 packet or an IPv6 packet, the header of the IP packet may contain relatively large and unnecessary control information. The PDCP layer reduces the header size of the IP packet so as to efficiently transmit the IP packet through a radio interface.

An RRC layer belonging to a third layer is defined only in the control plane. The RRC layer serves to control the logical channel, the transport channel, and the physical channel in association with configuration, reconfiguration, and release of radio bearers (RBs). An RB is a service provided by the second layer for data transmission between the UE and the E-UTRAN.

A downlink transport channel transmits data from the network to the UE. Examples of the downlink transport channel include a broadcast channel (BCH) for transmitting system information and a downlink-shared channel (DL-SCH) for transmitting user traffic or control messages. User traffic of downlink multicast or broadcast services or control messages can be transmitted on the DL-SCH or a downlink-multicast channel (DL-MCH). An uplink transport channel transmits data from the UE to the network. Examples of the uplink transport channel include a random access channel (RACH) for transmitting initial control messages and an uplink-shared channel (UL-SCH) for transmitting user traffic or control messages.

FIG. 4 shows an example of a hybrid automatic repeat request (HARQ) scheme. This example shows detailed implementation of HARQ applied to a downlink physical layer in a wireless packet communication system.

Referring to FIG. 4, a BS transmits a control message to a UE on a downlink control channel at step S110. At a time point associated with the control message, the BS transmits user data to the UE on a downlink shared channel at step S120. The downlink control channel may be a high speed-shared control channel (HS-SCCH). The downlink shared channel may be a high speed-downlink shared channel (HS-DSCH). The control message includes information regarding the UE which receives a packet, information regarding a format (e.g., a coding rate, a modulation scheme, a data amount, etc.) of the packet to be transmitted to the UE, etc. The UE receives the downlink control channel and thus knows the format of the packet to be delivered to the UE and a transmission time. Accordingly, the UE can receive the packet.

After receiving the packet, the packet is subjected to decoding. If the UE fails in decoding the packet, the UE transmits a non-acknowledgement (NACK) signal to the BS at step S130. The NACK signal may be transmitted on a high speed-dedicated physical control channel (HS-DPCCH). Upon receiving the NACK signal, the BS senses that packet transmission to the UE has failed, and thus retransmits the same data at a proper time point in the same packet format or a new packet format at steps S140 and S150. In this case, the UE may attempt decoding again by combining the retransmitted packet and the previous packet, which has been previously received but has failed in decoding, in various manners.

Otherwise, if the UE successfully decodes the received packet, the UE transmits an acknowledgement (ACK) signal to the BS at step S160. The ACK signal may be transmitted on the HS-DPCCH, i.e., an uplink channel. Upon receiving the ACK signal, the BS senses that packet transmission to the UE has been successful, and thus transmits a next packet. A channel used in the transmission of the ACK/NACK signal is referred to as an ACK/NACK channel.

Hereinafter, channels and information used when data is transmitted or received by using uplink and downlink radio resources will be described.

Two types of channels can be generally used when a UE receives data by using a downlink radio resource. One of the channels is a DL-SCH used to transmit actual data, and the other is a downlink L1/L2 channel used to transmit information regarding a method of processing data received on the DL-SCH. The downlink L1/L2 is also referred to as a physical downlink control channel (PDCCH). Information transmitted on the downlink L1/L2 control channel is referred to as downlink scheduling information. The downlink scheduling information may include a variety of information as follows:

identifier information: UE identifier or group identifier;
resource assignment: information on assigned radio resources, e.g., time/frequency;
duration assignment: effective duration of assigned radio resources;
multi-antenna information: information regarding a multiple input multiple output (MIMO) scheme or a beamforming scheme;
modulation information;
a payload size;
asynchronous HARQ information: a HARQ process number, a redundancy version, and a new data indicator; and
synchronous HARQ information: a retransmission sequence number.

Likewise, two types of channels can be used when the UE transmits data on an uplink radio resource. One of the channels is a UL-SCH used to transmit actual data, and the other is a downlink L1/L2 channel used to receive information from the BS, wherein the information is in regard to a method of processing data to be transmitted on the UL-SCH. The downlink L1/L2 is also referred to as a physical downlink control channel (PDCCH). Information transmitted on the downlink L1/L2 control channel is referred to as uplink scheduling information. The uplink scheduling information may include a variety of information as follows:

identifier information;
resource assignment;
duration assignment; and
transmission parameters: information regarding a modulation scheme, a payload size, a MIMO scheme, etc.

Hereinafter, scheduling schemes of uplink or downlink radio resources will be described.

A first scheme is a dynamic scheduling scheme. Basically, the dynamic scheduling scheme requires downlink scheduling information or uplink scheduling information whenever data is transmitted in one transmission time interval (TTI). Herein, the TTI represents a time required when data is transmitted one time. For example, in a case where a UE and a BS operate in an asynchronous HARQ manner to transmit or receive data, if the dynamic scheduling scheme is used, the downlink scheduling information or the uplink scheduling information needs to be transmitted not only when data is initially transmitted but also when the data is re-transmitted. On the contrary, in a case where the UE and the BS operate in a synchronous HARQ manner, if the dynamic scheduling scheme is used, the downlink scheduling information or the uplink scheduling information needs to be transmitted only when the data is initially transmitted, rather than when the data is retransmitted. In addition, if the dynamic scheduling scheme is used, the downlink scheduling information or the uplink scheduling information is useful for only one UE.

A second scheme is a persistent or static scheduling scheme. In the aforementioned dynamic scheduling scheme, the downlink scheduling information or the uplink scheduling information is transmitted for the method of processing transmitted and received data in every TTI. On the other hand, in the static scheduling scheme, the method of processing transmitted and received data is reported in advance by using an RRC signal, similarly to the case where the BS establishes an RB. Accordingly, when the UE transmits or receives data, the UE uses information determined by using the RRC signal in advance even when there is no downlink scheduling information or uplink scheduling information. For example, if it is predetermined by the BS that the UE receives data in downlink by using the RRC signal, and if it is assumed herein that a radio resource is A, a transmission scheme is B, and a period is C, then the UE may receive the data by using the values A, B, and C without having to use addition downlink scheduling information in every TTI. Likewise, when the UE transmits data to the BS, the UE can transmit the data according to the values A, B, and C without having to use addition uplink scheduling information in every TTI.

Hereinafter, a header compression scheme performed in a PDCP layer will be described. The header compression scheme uses a fact that IP packets belonging to the same packet stream do not experience many changes in their IP headers. In the header compression scheme, invariable fields are stored in a context format in a compressor of a transmitter and a de-compressor of a receiver, and after a context is formed, only variable fields are transmitted. Therefore, an overhead can be reduced which is produced when a full header of the IP header has to be transmitted all the time. The compressor and the de-compressor may be located in the PDCP layer.

FIG. 5 shows an example of transmission of a full header (FH) packet and a compressed header (CH) packet when a header compression scheme is used.

Referring to FIG. 5, in an initial stage of header compression, a compressor transmits a FH packet so that a context for a specific packet stream is formed in a de-compressor. The header compression does not result in a gain when the FH packet is transmitted. However, after the context is formed in the de-compressor, the gain becomes significant since the compressor transmits only a CH packet.

Whether to transmit the specific packet stream as a FH packet or a CH packet is determined by the compressor. In general, when the context is first formed for the specific packet stream, the FH packet is transmitted and thereafter the CH packet is transmitted. The FH packet is retransmitted whenever a predetermined time is over while the CH packet is transmitted, so that the context of the de-compressor is continuously synchronized to the context of the compressor.

When one IP packet is received from an upper layer, the compressor of a transmitter configures the packet into the FH packet or the CH packet according to a header pattern of the packet, and then transmits the configured packet to a receiver. If it is determined that there is a need to form or update a new context, the compressor transmits the packet as the FH packet. If it is determined that a header pattern of the packet has already been formed in the de-compressor, the compressor transmits the packet as the CH packet.

The de-compressor of the receiver has to form a context by first receiving the FH packet for the specific packet stream. This is because the context is used as a basis for decompressing compressed headers to be received at a later time. If the de-compressor receives the CH packet in a state where the context is not formed in the de-compressor, the de-compressor cannot restore an original header of the packet. Thus, the de-compressor discards the received packet.

When the header compression scheme is used for a specific packet switched (PS) service, a PDCP layer of the transmitter transmits an IP packet received as one stream having the same QoS from an upper layer. In this case, the IP packet is transmitted in the format of either a "packet that forms or updates a context" or a "packet that does not form or update a context". When the "packet that forms or updates a context" is not successfully transmitted to the receiver, all "packets that do not form or update a context" transmitted thereafter are discarded in the receiver without being decompressed. Thus, it can be said that the "packet that forms or updates a context" is much more important than the "packet that does not form or update a context".

Hereinafter, packet data transmission over VoIP will be described. As described above, the VoIP is a service for transmitting voice data over the IP, and is a service based on a PS domain. In the VoIP, there is a real-time transport protocol (RTP) for voice data and an RTP control protocol (RTCP) packet for controlling the RPT packet. An RTP packet having a compressed header is referred to as a CH RPT. An RTP packet having a full header is referred to as a FH RTP packet.

FIG. 6 shows transmission of a CH RTP packet.

Referring to FIG. 6, the CH RTP packet is transmitted by using a predetermined radio resource in one TTI period. In addition to the CH RTP packet, a FH RTP packet or an RTCP packet is optionally transmitted in a VoIP service. In this case, a problem may arise when the RTP packet or the RTCP packet is transmitted according to a static scheduling scheme.

FIG. 7 shows an example of a transmission delay of a CH RPT packet when a FH RPT packet and an RTCP packet are transmitted.

Referring to FIG. 7, a FH RTP packet, an RTCP packet and a CH RTP packet do not have a specific packet generation period. Therefore, the generation of the packets cannot be predicted. A size of the FH RTP packet is larger than that of the CH RTP packet. Thus, in a situation where only radio resources suitable for the CH RTP packet are assigned according to a static scheduling scheme, a transmission delay of the RTCP packet inevitable occurs when the FH RTP packet or the RTCP packet is transmitted by using the radio resources assigned for the CH RTP packet.

A method of generating a radio resource request message for requesting an additional radio resource is disclosed when there is a need to transmit a FH RTP packet and an RTCP packet. The method also discloses information on to be included in the radio resource request message. For example, when a BS statically pre-assigns a radio resource for transmitting a CH RTP packet by using an RRC message according to a static scheduling scheme, a UE transmits the CH RTP packet by using the radio resource. Under this situation, if transmission of an unpredicted FH RTP packet or RTCP packet is requested, the statically assigned radio resources are insufficient to transmit the FH RTP packet or the RTCP packet. To address this problem, the UE generates the radio resource request message for requesting an additional radio resource and transmits the radio resource request message.

Hereinafter, a method of generating a radio resource request message according to a packet type (i.e., a FH RTP packet and an RTCP packet) will be described. In general, a header is compressed in a PDCP layer, and a radio resource management function related to the request and assignment of radio resources is performed in a MAC layer. The MAC layer does not know whether a packet is a FH RTP packet or a CH RTP packet. Therefore, there is a need for a method of requesting radio resources from an upper layer to a lower layer (e.g., the MAC layer).

According to a first embodiment of the present invention, a PDCP protocol data unit (PDU) is transmitted from a PDCP layer to a lower layer by including a packet type indicator in the PDCP PDU in order to identify a CH RTP packet, a FH RTP packet, and an RTCP packet.

Table 1 shows an example of the packet type indicator included in the PDCP PDU in the PDCP layer.

TABLE 1

| Packet Type | Packet Type Indicator |
|---|---|
| CH RTP | 0 |
| FH RTP | 1 |
| RTCP | 2 |
| SIP/SDP | 3 |

The PDCP PDU including the packet type indicator is delivered from the PDCP layer to an RLC layer. Then, according to the packet type indicator, the RLC layer delivers an RLC protocol data unit (PDU) to the lower layer by including an additional packet type indicator. This is because the packet type indicator generated in the PDCP layer cannot be directly read in the MAC layer.

Table 2 shows an example of the packet type indicator included in the RLC PDU of the RLC layer.

TABLE 2

| Packet Type Indicator in RLC | Packet Type Indicator in PDCP |
|---|---|
| 0 | 0 |
| 1 | 1 |
| 1 | 2 |
| 1 | 3 |

In the MAC layer, the FH RTP packet, the CH RTP packet, and the RTCP packet are identified by using the packet type indicator in the RLC layer. Accordingly, a radio resource request message is triggered.

The packet type indicators of Tables 1 and 2 are shown only for exemplary purposes. Thus, various modifications may be made therein by those skilled in the art. As shown in Tables 1 and 2, the PDCP layer processes a packet delivered from an upper layer and then delivers the processed packet to the RLC layer, i.e., a lower layer, by including the packet type indicator. Likewise, the RLC layer re-processes data delivered from the PDCP layer, i.e., an upper layer, and then delivers the re-processed data to the MAC layer, i.e., a lower layer, by including a suitable packet type indicator according to the packet type indicator in the PDCP layer.

An operation of a UE will now be described with reference to Tables 1 and 2. A PDCP layer transmits a PDCP PDU to an RLC layer by including a packet type indicator according to a packet type (i.e., a FH RTP packet, a CH RTP packet, an RTCP packet, and a session initiation protocol (SIP)/session description protocol (SDP) packet). The RLC layer checks the packet type indicator in the PDCP PDU. If the packet type indicator is set to '0', the RLC layer delivers the RLC PDU to a MAC layer by setting the packet type indicator in the RLC PDU to '0'. Otherwise, if the packet type indicator in the RLC PDU is set to '1', '2', or '3', the RLC layer delivers the RLC PDU to the MAC layer by setting the packet type indicator in the RLC PDU to '1'. Accordingly, the MAC layer checks the packet type indicator in the RLC PDU. If the packet type indicator is set to '1', a radio resource request message is triggered.

Information regarding the packet type indicator to be used in the PDCP layer and the RLC layer may be predetermined for the UE by a BS by using an RRC message. In the RLC layer and the PDCP layer of a receiver, the RLC PDU and PDCP PDU including the packet type indicator are delivered to an upper layer after removing headers thereof.

According to a second embodiment of the present invention, when a FH RTP packet and an RTCP packet are triggered, a PDCP layer can report this to a MAC layer by using triggering indication. The triggering indication includes information regarding whether the MAC layer will trigger a radio resource request message. The PDCP layer can determine the triggering of the FH RTP packet, the CH RTP packet, and the RTCP packet. The PDCP layer determines a type of a packet delivered from an upper layer. If the RTCP packet is delivered, the PDCP layer informs the MAC layer that the RTCP packet is triggered. Accordingly, the MAC layer can trigger the radio resource request message. If the PDCP layer receives the RTP packet from the upper layer, the PDCP layer determines whether the RTP packet generated by a header compressor is the CH RTP packet or the FH RTP. If the FH RTP packet is generated, the PDCP layer reports the determination information to the MAC layer. Accordingly, the MAC layer triggers the radio resource request message.

Table 3 shows an example of triggering indication provided from the PDCP layer to the MAC layer according to a packet type.

TABLE 3

| Packet Type | Triggering indication to MAC layer |
|---|---|
| CH RTP | OFF |
| FH RTP | ON |
| RTCP | ON |
| SIP/SDP | ON |

In order to use this method, the BS allows the PDCP layer to process packets delivered from an upper layer and to determine a type of each packet according to a specific scheduling scheme, e.g., a static scheduling scheme. When a type of a specific packet is triggered, the PDCP layer informs in advance the MAC layer of the triggering indication by using an RRC signal.

According to a third embodiment of the present invention, a PDCP layer delivers a CH RTP packet, a FH RTP packet, and an RTCP packet to a lower layer by using different logical channels. The MAC layer can determine triggering of the FH RTP packet and the RTCP packet according to a state of an RLC buffer of a logical channel on which the FH RTP packet and the RTCP packet are delivered.

FIG. 8 shows a method of using a different logical channel according to a packet type.

Referring to FIG. 8, by using an RRC signal, a BS configures a CH RTP packet to be transmitted on a logical channel A and configures a FH RTP packet and an RTCP packet to be transmitted on a logical channel B. Then, in an RLC layer, an RLC buffer is generated for each logical channel. When packets are stored in the buffer, information indicating a buffer amount is informed to a MAC layer. According to the buffer amount of the logical channel B, the MAC layer of a UE can determine whether the FH RTP packet and the RTCP packet are triggered.

FIG. 9 shows an example of transmission and reception of voice data on a logical channel identified according to a packet type.

Referring to FIG. 9, a BS informs a UE of information regarding a type of an available logical channel according to each packet type by using an RRC signal. A PDCP layer receives an RTP packet or an RTCP packet from an upper layer. By using configured logical channels, a header compressor and a splitter deliver a CH RTP packet and a FH RTP packet (or an RTCP packet) to a lower layer by splitting these packets.

The received packets are re-decompressed by a combiner and a header de-compressor to obtain RTP packets or RTCP packets.

FIG. 10 shows an example of triggering for radio resource request by using an RLC buffer.

Referring to FIG. 10, a CH RTP packet is delivered to a first RLC buffer RLC1, and a FH RTP packet or an RTCP packet is delivered to a second RLC buffer RLC2. A MAC layer checks the second RLC buffer RLC2 to which the FH RTP packet or the RTCP packet is delivered. If it is determined that the packet is stored in the second RLC buffer RLC2, the MAC layer triggers a radio resource request message.

According to a fourth embodiment of the present invention, a radio resource request message is triggered according to an amount of data stored in buffers of a PDCP layer, an RLC layer, and an MAC layer. A reference value of the data amount may be a threshold predetermined for a UE by a BS by using an RRC signal.

FIG. 11 shows an example of triggering for radio resource request according to a data amount of an RLC buffer.

Referring to FIG. 11, when a predetermined amount of RTP or RTCP packets are stored in a buffer of an RLC layer, a UE compares a current buffer amount with a threshold predetermined by a BS. If the amount of data stored in the buffer exceeds the threshold, a MAC layer triggers a radio resource request message. Likewise, the radio resource request message may be triggered according to an amount of data stored in a buffer of a PDCP layer or a buffer of the MAC layer and also according to corresponding thresholds.

A layer which serves to trigger the radio resource request message is the MAC layer. Thus, if a buffer amount of the PDCP layer or the RLC layer exceeds a threshold, this is reported to the MAC layer. Accordingly, the MAC layer triggers the radio resource request message.

The threshold may have different values according to layers (i.e., the PDCP layer, the RLC layer, and the MAC layer). The threshold can be reported from the BS to the UE by using an RRC signal.

When an RLC buffer is used, a variety of thresholds may be used according to data which is carried on a logical channel and stored in the RLC buffer. For example, if a CH RTP packet is transmitted on a logical channel A, and a FH RTP packet is transmitted on a logical channel B, then a threshold may be set to 100 in an RLC buffer of the logical channel A, and a threshold may be set to 200 in the RLC buffer of the logical channel B.

The aforementioned four embodiments are conditions in which a UE triggers a radio resource request message. The UE triggers the radio resource request message when each condition is satisfied. A BS may configure the UE to satisfy only one of the four conditions or two or more of the four conditions. Information on the conditions may be transmitted from the BS to the UE by using an RRC signal.

Hereinafter, a process of generating a radio resource request message and then transmitting the radio resource request message will be described.

A MAC layer can be logically divided into two states. One is a normal state, and the other is a transmission state. The normal state is a state in which a UE can sufficiently transmit data by using a radio resource assigned by a BS. That is, in the normal state, only a CH RTP packet is present in a buffer of the UE, and thus there is no problem when the packet is transmitted by using the radio resource assigned using an RRC signal. Accordingly, the UE does not require transmission of the radio resource request message. On the other hand, the transmission state is a state in which the UE cannot transmit data satisfactorily due to shortage of the radio resource assigned by the BS. That is, in the transmission state, a FH RTP packet and/or an RTCP packet are present in the buffer of the UE in addition to the CH RTP packet, and thus the radio resource request message needs to be transmitted to the BS because an additional radio resource is required. The following descriptions will explain a state transition of a UE when the radio resource request message is triggered in the UE.

FIG. 12 shows an example of a transition to a normal state.

Referring to FIG. 12, a transmitter transmits a radio resource request message according to a packet type (i.e., a FH RTP packet or an RTCP packet) indicated in a PDCP layer or an RLC layer (step S310). The transmitter transmits the FH RTP packet or the RTCP packet by using an assigned radio resource (step S320). A receiver transmits an ACK signal upon successfully receiving the FH RTP packet or the RTCP packet (step S330). If the ACK signal is received, it means that the FH RTP packet or the RTCP packet has been successfully received. Then, the UE transitions to the normal state.

FIG. 13 shows another example of a transition to the normal state.

Referring to FIG. 13, the UE transitions from a transmission state to the normal state when a FH RTP packet and an RTCP packet to be delivered on a specific logical channel are completely transmitted. For example, assume that a logical channel A for delivering a CH RTP packet and a logical channel B for delivering the FH RTP packet and the RTCP packet are configured when a BS establishes an RB for a VoIP service by using an RRC signal. In this case, an RLC buffer is generated for each logical channel. Packets of each logical channel are stored in the RLC buffer. Packets of the logical channel A are stored in an RLC buffer A. Packets of the logical channel B are stored in an RLC buffer B. A MAC layer of the UE checks a buffer state of the logical channel B, and transmits the radio resource request message to the BS until there is no data in the buffer. In this case, information regarding a specific logical channel whose RLC buffer amount will be checked for is reported from the BS to the UE by using the RRC signal.

FIG. 14 shows another example of a transition to a normal state.

Referring to FIG. 14, if a buffer amount is below a threshold determined by a BS, a UE can transition from the transmission state to the normal state. The UE has two thresholds. When an amount of data stored in a buffer exceeds a first threshold, the UE triggers a radio resource request message and starts transmission of the radio resource request message. If the amount of data stored in the buffer is below a second threshold, transmission of the radio resource request message stops. Information on the first threshold and the second threshold can be reported from the BS to the UE by using the RRC signal. The first threshold and the second threshold may have the same value or different values.

At time T, the amount of data stored in the RLC buffer is below the first threshold. Thus, only data is transmitted without the radio resource request message at step S410. This is the normal state.

At time T+N₁, the amount of data stored in the RLC buffer is below the first threshold. Thus, only data is transmitted without the radio resource request message at step S420.

At time T+N₂, the amount of data stored in the RLC buffer exceeds the first threshold. Thus, the radio resource request message is transmitted at step S430. This is the transmission state.

At time T+N₃, the amount of data stored in the RLC buffer is below the first threshold and above the second threshold. Thus, the radio resource request message is transmitted at step S440.

At time T+N₄, the amount of data stored in the RLC buffer is below the second threshold. Thus, only data, is transmitted without the radio resource request message at step S450.

The BS determines a threshold by using an RRC signal. The RRC signal may be system information or a paging message. Accordingly, the UE compares the amount of data stored in the RLC buffer with the determined threshold and thus determines whether to trigger or transmit the radio resource request message.

Hereinafter, a transmission condition of a radio resource request message will be described.

FIG. 15 is a flow diagram showing an example of a method of transmitting a radio resource request message.

Referring to FIG. 15, if the radio resource request message is triggered, a UE transmits the radio resource request message to a BS. As described above, the UE triggers the radio resource request message in the following cases.

(1) Specific information is included in a data block (i.e., a PDCP PDU or an RLC PDU) when the data block is delivered from a PDCP layer or an RLC layer to an MAC layer.

(2) Triggering of the radio resource request message is indicated to the MAC layer under the determination of the PDCP layer or the RLC layer.

(3) Data exists in an RLC buffer of a specific logical channel.

(4) A RLC buffer amount of the logical channel exceeds a threshold determined by the BS.

That is, the UE determines whether the radio resource request message is triggered under the conditions of (1) to (4), and transmits the triggered radio resource request message to the BS.

FIG. 16 is a flow diagram showing another example of a method of transmitting a radio resource request message.

Referring to FIG. 16, a UE transmits the radio resource request message to a BS when the UE transitions from a transmission state from a normal state. The UE is either in the transmission state in which transmission of the radio resource request message is requested or in the normal state in which transmission of the radio resource request message is not requested. That is, the UE transmits the radio resource request message when in the transmission state. In addition, even when the UE transitions to the normal state according to a specific standard, the UE transmits the radio resource request message to the BS, so that the BS can manage the state of the UE in a more proper manner.

FIG. 17 is a flow diagram showing another example of a method of transmitting a radio resource request message.

Referring to FIG. 17, when in a transmission state, a UE periodically transmits the radio resource request message to a BS. For example, the BS informs the UE of a request timer value for periodically transmitting the radio resource request message by using an RRC signal. Herein, the request timer value is 20 ms. The RRC signal may be system information or a paging message.

A request timer starts to operate when the UE transitions to the transmission state in which transmission of the radio resource request message is requested. The UE transmits the radio resource request message to the BS when the request timer is expired. The request timer is resumed when the radio resource request message is properly transmitted to the BS. Thereafter, the request timer stops when the UE transitions from the transmission state to the normal state.

FIG. 18 is a flow diagram showing another example of a method of transmitting a radio resource request message.

Referring to FIG. 18, when a UE is in a transmission state, and a triggering condition of the radio resource request message is satisfied, then the UE transmits the radio resource request message. The UE may stay in the transmission state for a predetermined duration after the UE transitions to a transmission state. If the UE transitions to the transmission state when the BS transmits an RRC signal, a minimal duration for maintaining the transmission state can be set. For example, if the minimal duration for maintaining the transmission state is set to 100 ms, the UE can stay in the transmission state at least 100 ms when the UE transitions to the transmission state. If the radio resource request message is triggered during this minimal duration, the UE transmits the radio resource request message to the BS.

Hereinafter, information included in a radio resource request message when a UE transmits the radio resource request message will be described.

FIG. 19 is a flow diagram showing an example of transmission of a radio resource request message.

Referring to FIG. 19, a BS informs a UE of a packet type set by using an RRC signal at step S510. For example, an index '00' denotes a CH RTP, an index '01' denotes a FH RTP, an index '10' denotes an RTCP packet, and an index '11' denotes other packets.

The UE transmits information regarding the packet type by including the information in the radio resource request message at step S520. The UE determines whether the radio resource request message is triggered according to a packet type, and thus transmits a packet type index to the BS. If the radio resource request message is triggered by using the FH RTP packet, the UE allows the index '01' to be included in the radio resource request message in transmission, so as to inform the BS that the FH RTP packet is triggered.

If the UE triggers the radio resource request message by using the RTCP packet, the UE transmits to the BS the radio resource request message including the index '10' at step S530.

FIG. 20 is a flow diagram showing another example of transmission of a radio resource request message. A UE can transmit the radio resource request message including data of a specific logical channel.

Referring to FIG. 20, a BS informs a UE of a specific logical channel identifier (Id) that can be included in the radio resource request message by using an RRC signal at step S610. For example, assume that the logical channel Id is 'A' as shown in FIG. 20. In this case, when the radio resource request message is triggered and when data exists in a buffer of the logical channel A, the UE transmits the radio resource request message together with the data of the logical channel A to the BS at step S620. This is because, if a size of the radio resource request message is less than a size of an assigned radio resource, the radio resource becomes less effective when only the radio resource request message is transmitted by using the assigned radio resource.

For another example, according to a logical channel priority determined by the BS, the radio resource request message may be transmitted to the BS together with data of a logical channel having a high priority. For another example, unlike priority of the existing logical channel, priority of a specific logical channel may be determined for the UE by the BS by using an RRC signal when the radio resource request message is triggered, so that the radio resource request message can be transmitted together with data of a logical channel having a high priority according to the priority of the specific logical channel.

FIG. 21 is a flow diagram showing another example of transmission of a radio resource request message.

Referring to FIG. 21, a UE transmits information regarding a buffer amount of the UE by including the information in the radio resource request message. The information may include a total buffer amount, a buffer amount of a specific logical channel, an identifier of the specific logical channel, an identifier of the UE (e.g., a cell-radio network temporary identifier (C-RNTI)), etc.

FIG. 22 is a flow diagram showing another example of transmission of a radio resource request message.

Referring to FIG. 22, a UE transmits the radio resource request message by including an amount of data or radio resources required in next transmission. For example, under the assumption that a period of an assigned radio resource is 20 ms, the UE transmits the radio resource request message by including an amount of data to be transmitted in a next transmission time or a size or amount of a radio resource required in the next transmission.

FIG. 23 is a block diagram showing constitutional elements of a UE. A UE 50 includes a processor 51, a memory 52, a radio frequency (RF) unit 53, a display unit 54, and a user interface unit 55. The processor 51 provides a control plane and a user plane. A monitoring function of the control channel can be implemented in the processor 51. Layers of the radio interface protocol are implemented in the processor 51. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting a data block in a wireless communication system, the method comprising:
   generating, at a packet data convergence protocol (PDCP) layer, a data block including a packet type indicator that indicates a type of the data block;
   triggering, at a medium access control (MAC) layer, a radio resource request message according to the packet type indicator;
   transmitting, at the MAC layer, the radio resource request message to a base station; and
   transmitting the data block through a radio resource allocated by the radio resource request message,
   wherein the type of the data block is a compressed header (CH) real-time transport protocol (RTP) packet, a full header (FH) RTP packet, an RTP control protocol (RTCP) packet or a session initiation protocol (SIP)/ session description protocol (SDP) packet.

2. The method of claim 1, wherein the radio resource request message is triggered when the type of the data block is the FH RTP packet or the RTCP packet.

3. The method of claim 1, further comprising:
   transmitting the data block including the packet type indicator from the PDCP layer to a radio link control (RLC) layer; and
   transmitting a second data block including a second packet type indicator from the RLC layer to the MAC layer, the second packet type indicator corresponding to the packet type indicator.

4. The method of claim 3, wherein:
   the second packet type indicator is set to 0 if the packet type indicator indicates that the type of the data block is the CH RTP packet; and
   the second packet type indicator is set to 1 if the packet type indicator indicates that the type of the data block is the FH RTP packet, the RTCP packet or the SIP/SDP packet.

5. The method of claim 4, wherein the radio resource request message is triggered when the second packet type indicator is set to 1.

6. The method of claim 1, wherein information regarding the packet type indicator is predetermined by the base station.

* * * * *